US011015631B2

(12) United States Patent
Huang

(10) Patent No.: US 11,015,631 B2
(45) Date of Patent: May 25, 2021

(54) RETRACTABLE LOCKS

(71) Applicant: Hewlett-Packard Development Company, L.P., Houston, TX (US)

(72) Inventor: Chin-Hung Huang, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 393 days.

(21) Appl. No.: 15/748,822

(22) PCT Filed: Jan. 29, 2016

(86) PCT No.: PCT/US2016/015693
§ 371 (c)(1),
(2) Date: Jan. 30, 2018

(87) PCT Pub. No.: WO2017/131755
PCT Pub. Date: Aug. 3, 2017

(65) Prior Publication Data
US 2018/0320725 A1    Nov. 8, 2018

(51) Int. Cl.
*F16B 21/06* (2006.01)
*G06F 1/16* (2006.01)
(52) U.S. Cl.
CPC .......... *F16B 21/065* (2013.01); *G06F 1/1654* (2013.01); *G06F 1/1656* (2013.01); *G06F 1/1669* (2013.01)
(58) Field of Classification Search
CPC ......... Y10T 403/7005; Y10T 403/7007; Y10T 292/11; F16B 21/02; F16B 21/04; G06F 1/1679; G06F 1/1669; G06F 1/1654; G06F 1/1656; E05B 63/244; E05B 63/248
See application file for complete search history.

(56) References Cited

U.S. PATENT DOCUMENTS

| 5,335,142 | A   |   | 8/1994  | Anderson et al. |            |
|-----------|-----|---|---------|-----------------|------------|
| 5,884,515 | A   | * | 3/1999  | Milman          | E05B 47/068 |
|           |     |   |         |                 | 192/84.21  |
| 5,996,831 | A   | * | 12/1999 | Teok            | E05B 47/004 |
|           |     |   |         |                 | 220/230    |
| 6,552,314 | B2  | * | 4/2003  | Fukushima       | H05B 6/6447 |
|           |     |   |         |                 | 200/50.02  |
| 6,891,722 | B2  |   | 5/2005  | Chen et al.     |            |
| 6,922,333 | B2  |   | 7/2005  | Weng et al.     |            |
| 7,267,378 | B2  | * | 9/2007  | Drumm           | E05C 19/163 |
|           |     |   |         |                 | 292/251.5  |

(Continued)

FOREIGN PATENT DOCUMENTS

CN    202133962 U    8/2012
CN    102200802 B    3/2013

*Primary Examiner* — Jonathan P Masinick
(74) *Attorney, Agent, or Firm* — HP Inc. Patent Department

(57) ABSTRACT

In an example, a retractable lock may include a lock tab disposed within a first device in a first position. The lock tab may engage with a complementary tab receptacle disposed within a separate, second device when the lock tab protrudes out of the first device in a second position. The retractable lock may also include a bias member to bias the lock tab towards the first position, and a magnet to urge the lock tab to the second position when the magnet is drawn towards a magnetic material.

16 Claims, 8 Drawing Sheets

(56) References Cited

U.S. PATENT DOCUMENTS

| | | | |
|---|---|---|---|
| 7,390,035 B2* | 6/2008 | Karcz | E05B 13/101 |
| | | | 292/163 |
| 7,495,901 B2* | 2/2009 | Yun | E05B 47/004 |
| | | | 361/679.55 |
| 7,770,947 B2* | 8/2010 | Huang | E05C 19/168 |
| | | | 292/251.5 |
| 8,251,411 B2* | 8/2012 | Yang | H05K 5/03 |
| | | | 292/251.5 |
| 8,393,653 B2* | 3/2013 | Clark | E05B 15/101 |
| | | | 292/251.5 |
| 8,505,989 B2* | 8/2013 | Wells | E05C 19/163 |
| | | | 292/251.5 |
| 8,599,542 B1 | 12/2013 | Healey et al. | |
| 8,726,704 B2* | 5/2014 | White | A47B 88/60 |
| | | | 70/63 |
| 8,864,188 B2* | 10/2014 | Redgrave | E05C 19/16 |
| | | | 292/251.5 |
| 9,341,007 B2* | 5/2016 | Liao | E05C 19/166 |
| 9,482,491 B1* | 11/2016 | Luster | F16B 5/0642 |
| 9,877,549 B2* | 1/2018 | Perkins | A44C 5/147 |
| 10,520,795 B2* | 12/2019 | Wine | F16B 2/12 |
| 2005/0157456 A1 | 7/2005 | Wu et al. | |
| 2006/0056140 A1 | 3/2006 | Lev | |
| 2006/0220393 A1* | 10/2006 | Dimig | B60R 25/08 |
| | | | 292/251.5 |
| 2010/0238620 A1 | 9/2010 | Fish | |
| 2012/0042484 A1 | 2/2012 | Hsu Huang et al. | |
| 2014/0313665 A1 | 10/2014 | Delpier et al. | |
| 2014/0328014 A1 | 11/2014 | Lan et al. | |
| 2014/0355192 A1 | 12/2014 | Lin | |
| 2015/0030386 A1* | 1/2015 | Carnevali | F16B 21/02 |
| | | | 403/348 |
| 2020/0191188 A1* | 6/2020 | Carper | F16B 21/09 |

* cited by examiner

RETRACTABLE LOCKS

BACKGROUND

Electronic devices may work in conjunction with secondary devices or device accessories. Electronic devices may be coupled, or, in other words, attachable and detachable to the device accessories. Devices may be attached to accessories in various ways or through various mechanisms. Accessories may be fixed to devices, or may be attached in a removable manner, in some situations. Accessories may be coupled to devices through the use of magnets.

DETAILED DESCRIPTION

Devices such as electronic devices or, further, computing devices, may work in conjunction with secondary devices or device accessories. Such secondary devices or accessories may include, but are not limited to, keyboards, track pads, speakers, docks, charging accessories, or other secondary devices that may be used with the device. Devices may be coupled to the accessories, or, in other words, attachable and detachable to the accessories. Devices may be attached to accessories in various ways or through various mechanisms. Accessories may be fixed to devices, or may be attached in a removable manner, in some situations. Accessories may be coupled to devices through the use of magnets, or other components that may hold the accessory on to the device through the use of an attachment force or retaining force.

In some situations, it may be desirable to removably couple the secondary device to the electronic device in a manner such that the secondary device is easily and quickly attached and removed. In such a situation, the electronic device and the secondary device may employ magnets or magnetic, or ferrous, materials in order to magnetically couple the two devices to each other. Such a magnetic coupling may enable the secondary device to be easily and quickly attached to the electronic device, and also easily removed. Further, in some situations, it may be desirable to couple the secondary device to the electronic device in a manner such that the secondary device is firmly attached to the electronic device, and the secondary device will not accidentally become uncoupled from the electronic device. A magnetic coupling between the electronic device and the secondary device, while providing easy attachment and removal, may not provide a strong enough coupling between the two devices to avoid accidental removal of the secondary device from the electronic device. Moreover, employing a magnetic coupling that may be strong enough to avoid such accidental uncoupling may eliminate the easy and quick installation and removal aspect of the magnetic coupling, making willful removal of the secondary device difficult for a user.

Implementations of the present disclosure provide retractable locks to couple a secondary device to an electronic device in an easy and quick fashion. Further, implementations of the present disclosure provide retractable locks that couple the secondary device to the electronic device firmly, so as to avoid accidental removal of the secondary device from the electronic device. Retractable locks, as described in the present disclosure, may also enable quick and easy willful removal of the secondary device from the electronic device, while still preventing accidental removal.

Figure 1A:
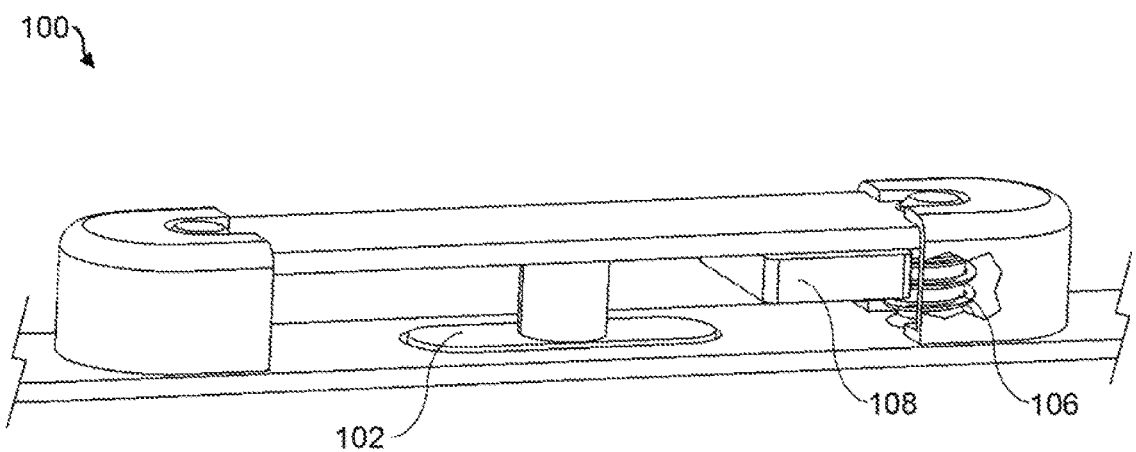
FIG. 1A is a perspective view of an example retractable lock.
Figure 1B:
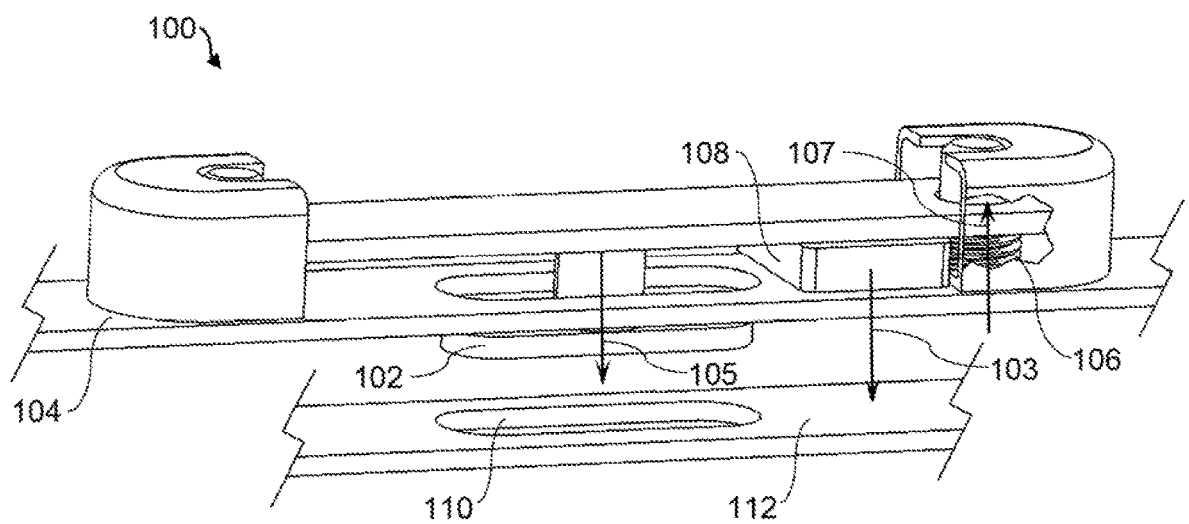
FIG. 1B is a perspective view of an example retractable lock.

Referring now to FIG. 1A, a perspective view of an example retractable lock 100 is illustrated. The example retractable lock 100 may include a lock tab 102, a bias member 106, and a magnet 108. Referring additionally to FIG. 1B, a perspective view of an example retractable lock 100 is illustrated, wherein the retractable lock 100 is disposed within a first device 104. In some implementations, the first device 104 may be an electronic device. Further, in some implementations the electronic device may be a computing device, such as a computer, tablet, smart phone, or other computing device that may include a processor and electrical circuitry.

The lock tab 102 may be a rigid or semi-rigid component that is able to move from a first position retracted within the first device 104, as illustrated in FIG. 1A, and a second position protruding from the first device 104, as illustrated in FIG. 1B. It should be noted that, in this context, the lock tab 102 may still be considered retracted within the first device 104 if the outermost edge of the lock tab 102 is only flush with the outside surface of the first device 104, and not retracted within the outside surface. In some implementations, the lock tab 102 may translate or move from the first position to the second position along direction 105. In other implementations, the lock tab 102 may move along another direction that may enable the lock tab 102 to extend or protrude from the first device 104. The lock tab 102 may include a geometry that, when protruding from the first device 104, the lock tab 102 may create a cavity or ledge in between the lock tab 102 and the outside surface of the first device 104 such that a portion of another device or a receptacle therein may be disposed and retained in between the protruding portion of the lock tab 102 and the first device 104. For example, the lock tab 102 may include a T-shaped geometry, as shown in FIGS. 1A-B. In other implementations, the lock tab 102 may include an L-shaped geometry, or another geometry wherein the portion of the lock tab 102 that protrudes from the first device 104 when the lock tab 102 is in the second position includes a tab or other portion that extends laterally from the direction of the protrusion in order to create such a cavity or ledge.

The lock tab 102 may, in some implementations, engage with a complementary tab receptacle 110 disposed within a second device 112, as illustrated in FIG. 1B. The lock tab 102 may engage with, and be received by the tab receptacle 110 by inserting into the tab receptacle 110 along direction 105. In some implementations, the second device 112 may be a separate device from the first device 104. The second device 112 may be a secondary device, in some implementations, or, any device that a user wishes to couple to the first device 104. In further implementations, the second device 112 may be an accessory, such as a keyboard, track pad, speaker, dock, charging accessory, or other secondary device that may be used with the first device 104. The tab receptacle 110 may include a complementary shape to that of the lock tab 102, such that the lock tab 102 may be inserted into the tab receptacle 110 when the lock tab is disposed in the second position.

The retractable lock 100 may include a bias member 106. The bias member 106 may be a resilient component capable of elastic deformation, or, in other words, capable of returning to its original shape or geometry after being deformed. To achieve such elastic properties, the bias member 106 may include a material having an appropriate composition. Such a material may, in some implementations, be a spring steel, aluminum, or plastic. In some implementations, the bias member 106 may be a coil spring. In other implementations, the bias member 106 may be another type of spring having a different geometry, such as a tension spring, or a torsion spring. In further implementations, the bias member 106 may exert a resistive normal force in response to being deformed. The normal force may be exerted in a direction opposite to that of the deformation, and, further, the normal force may be proportional to the amount or degree of deformation.

The bias member 106, in some implementations, may bias the lock tab 102 towards the first position. In other words, the bias member 106 may exert a force on the lock tab 102 such that the force urges the lock tab 102 in a direction opposite that of the protrusion direction. In some implementations, the bias member 106 may exert a force on the lock tab 102 that is only partially towards the first position, such as a force that is at an angle relative to the direction of protrusion. Such a force vector may include one directional component that urges the lock tab 102 towards the first position.

The retractable lock 100 may also include a magnet 108. The magnet 108 may be a material or object that produces a magnetic field. The magnet 108 may be able to exert such a magnetic field on other magnets, or other ferrous materials, so as to attract or repel such a material. In some implementations, the magnet 108 may have a physical orientation or disposition such that it attracts other ferrous materials or other magnets. In other implementations, the magnet 108 may have an opposite orientation or disposition such that it repels other ferrous materials or other magnets. Further, the magnet 108 may have a first and second pole that each attract the opposite pole of other magnets and repel the same pole on other magnets, respectively.

The magnet 108 may be disposed within the retractable lock 100 such that the magnet 108 may urge the lock tab 102 to the second position when the magnet 108 is drawn or attracted towards a magnetic material such as a second magnet, or another ferrous material. In some implementations, the magnet 108 may be disposed within the first device 104. In further implementations, the magnet 108 may be fixed or coupled to the lock tab 102 within the first device 104 such that the magnet 108 urges, moves, or pulls the lock tab 102 from the first position to the second position when the magnet 108 is proximate to and magnetically drawn towards another magnet or magnetic material through a magnetic attraction 103. The magnet 108 may be coupled to the lock tab 102 such that, upon the magnet 108 being moved, the lock tab 102 may move in a corresponding direction. In some implementations, the magnetic attraction 103 may be strong enough such that the magnet 108 may overcome a resistive normal force 107 exerted on the lock tab 102 by the bias member 106, and pull the lock tab 102 to the second position, as illustrated in FIG. 1B. In some implementations, the resistive normal force 107 exerted by the bias member 106 may be proportional to the distance the lock tab 102 is pulled, and thus, the amount of deformation experienced by the bias member 106. Referring still to FIG. 1B, in some implementations, the second device 112 may comprise a magnetically ferrous material or a second magnet, so as to cause the magnetic attraction 103 between the second device 112 and the magnet 108. If the second device 112 comprises a second magnet, the second magnet may be oriented such that the magnet within the first device 104 is magnetically attracted to, or drawn to, the second magnet. Thus, in other words, upon the first device 104 being put in close enough proximity to the second device 112, the second magnet or other magnetic material therein may attract and pull the magnet 108 within the first device such that the magnet 108 pulls the lock tab 102 to the second position.

Figure 1C:
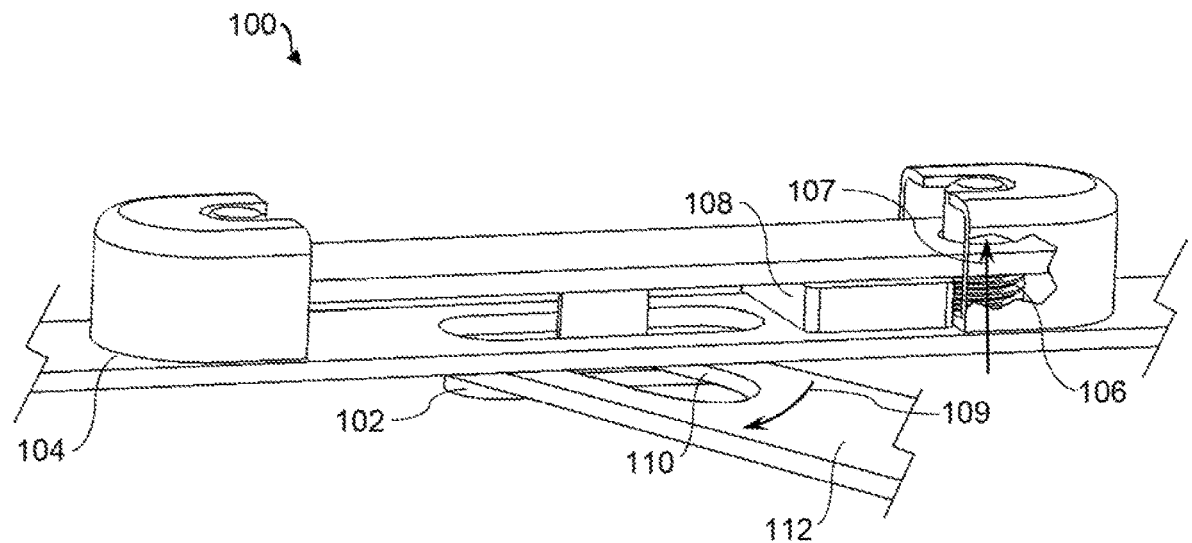
FIG. 1C is a perspective view of an example retractable lock.

Referring now to FIG. 1C, a perspective view of an example retractable lock 100 is illustrated, wherein the lock tab 102 of the retractable lock 100 is received within the complementary tab receptacle 110 of the second device 112. The lock tab 102 has been inserted into the tab receptacle 110 after the close proximity of magnetic material disposed within the second device 112 had caused the magnet 108 to pull the lock tab 102 from the first position to the second position, protruding out of the first device 104, as shown in FIG. 1B. After the lock tab 102 is inserted into the complementary tab receptacle 110 of the second device 112, the second device 112 may, in some implementations, be rotated relative to the first device 104 along a direction similar to or opposite to example rotation direction 109. Such a rotation may cause a the tab receptacle 110 to rotate relative to the lock tab 102 such that the lock tab 102 and the complementary shape of the tab receptacle 110 are no longer aligned, and the lock tab 102 can no longer be removed from the tab receptacle 110. In other words, after the lock tab 102 has been inserted into the tab receptacle, the first and second devices 104 and 112, respectively, may be rotated relative to each other so that the lock tab 102 is retained and locked within the tab receptacle 110, and the first and second devices 104 and 112 are coupled together and cannot be separated from one another while in their current orientation. In some implementations, the bias member 106 may continue to exert a resistive force 107 against the lock tab 102. In further implementations, if the magnet 108, through the rotation of the first and/or second devices 104 and 112, has been separated from the magnetic material of the second device 112 to a sufficient degree, the resistive force 107 may push the lock tab 102 in the direction towards the first position so that the lock tab 102 may pinch the second device 112 against the outside surface of the first device 104, further securing the coupling between the first and second devices 104 and 112. In other implementations, absent the pinching from the resistive force 107, the lock tab 102 may still be retained within the tab receptacle 110 due to the misalignment of the lock tab 102 and the tab receptacle 110 illustrated in FIG. 1C.

Figure 2A:
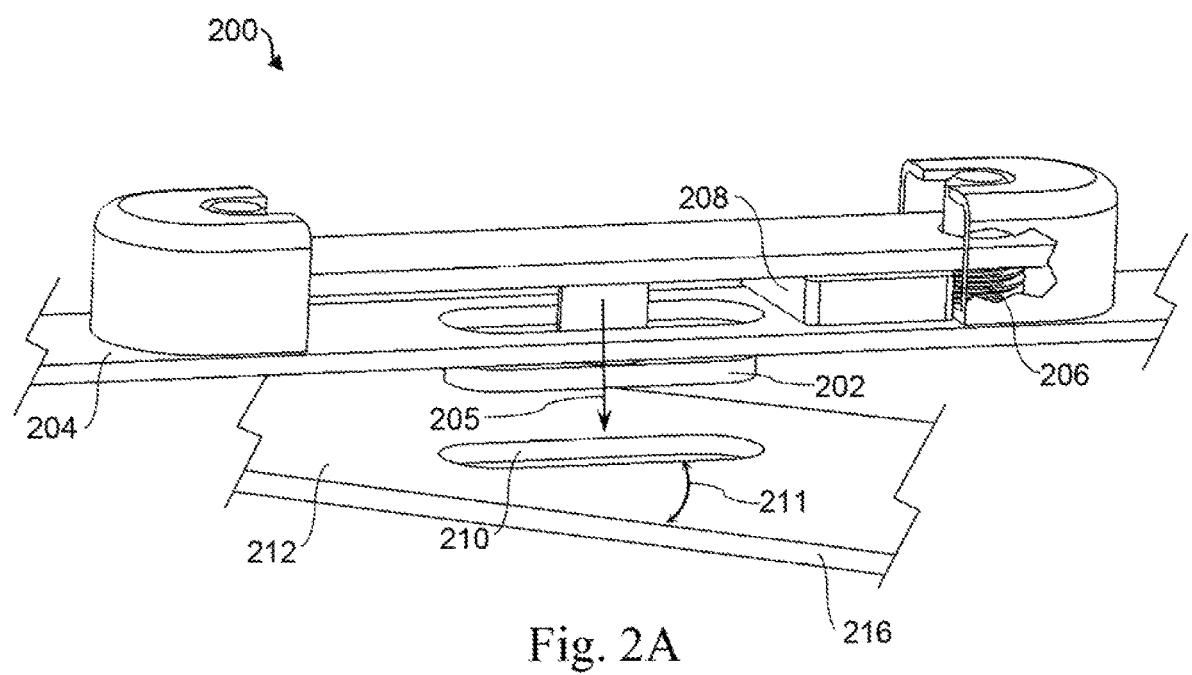
FIG. 2A is a perspective view of an example retractable lock.
Figure 2B:
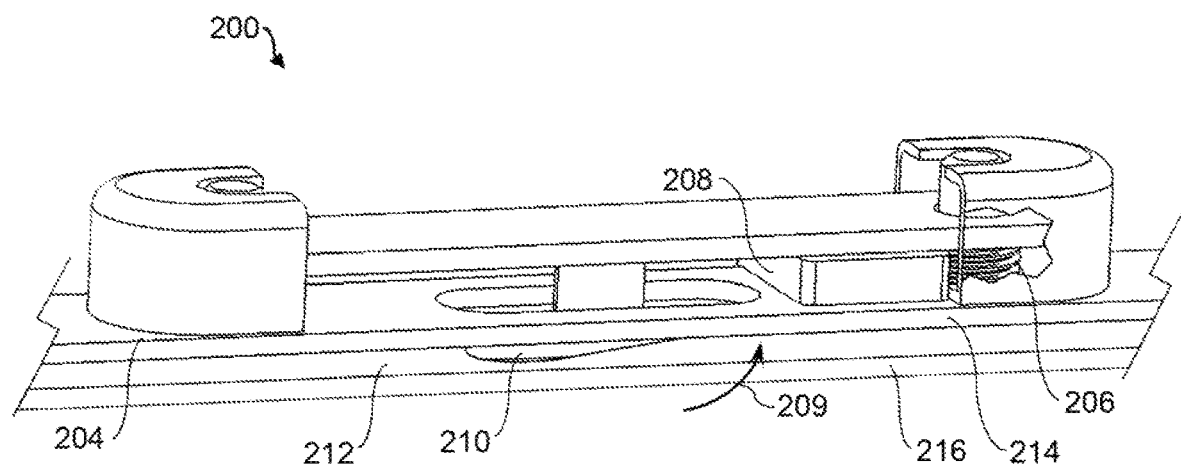
FIG. 2B is perspective view of an example retractable lock.

Referring now to FIG. 2A, a perspective view of an example retractable lock 200 is illustrated. Example retractable lock 200 may be similar to example retractable lock 100. Further, the similarly named elements of example retractable lock 200 may be similar in function and/or structure to the elements of example retractable lock 100, as they are described above. Retractable lock 200 may include a lock tab 202 retracted within a first device 204 in a first position, and protruding from the first device 204 in a second position. FIG. 2A illustrates the lock tab 202 disposed in the second position. The retractable lock 200 may also include a bias member 206 and a magnet 208, disposed within the first device 204. In some implementations, the lock tab 202 may insert into and engage with a complementary tab receptacle 210 disposed within a second device 212. In further implementations, the tab receptacle 210 may be disposed at an oblique angle 211 on the second device 212. In this context, oblique angle 211 may refer to or represent an angle other than parallel to a first surface 216 on the second device 212. The lock tab 202 may be inserted into the tab receptacle 210 at the oblique angle 211 along direction 205, as shown in FIG. 2A. Referring additionally to FIG. 2B, a perspective view of an example retractable lock 200 is illustrated, wherein the lock tab 202 is inserted into the tab receptacle 210. After the lock tab 202 is engaged with the tab receptacle 210, the first and second devices 204 and 210 may be rotated relative to each other such that the lock tab 202 and the tab receptacle 210 are no longer aligned, and the lock tab 202 is retained within the tab receptacle 210. In some implementations, the second device 212 may be rotated, for example along direction 209, such that the lock tab 202 is retained within the tab receptacle 210, and a first surface 214 of the first device 204 and the first surface 216 of the second device 212 are aligned with one another, as illustrated in FIG. 2B.

Figure 3:
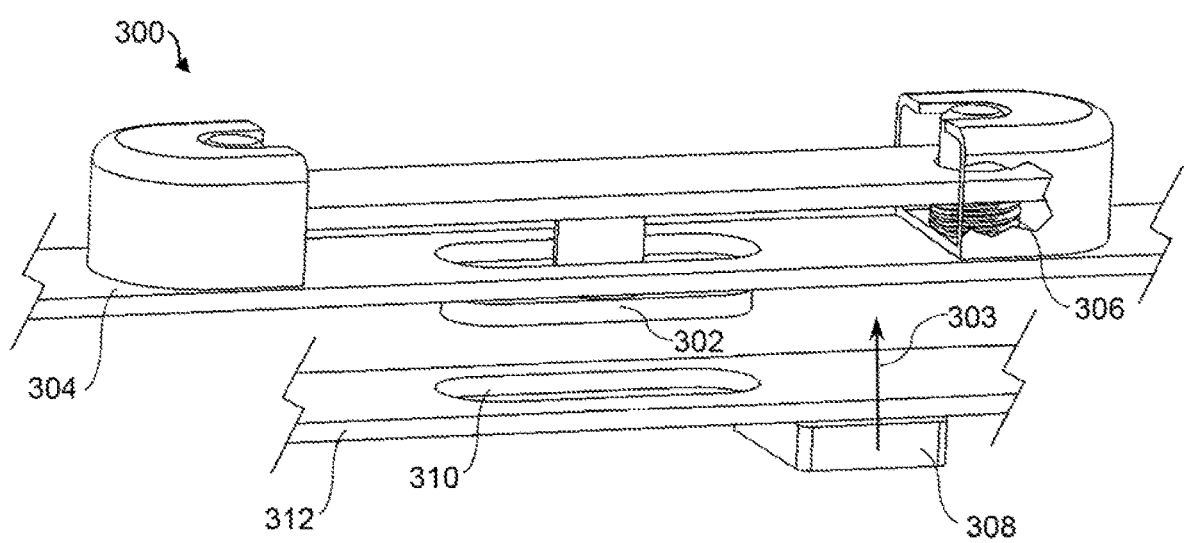
FIG. 3 is a perspective view of an example retractable lock.

Referring now to FIG. 3, a perspective view of an example retractable lock 300 is illustrated. Example retractable lock 300 may be similar to example retractable lock 100 or 200. Further, the similarly named elements of example retractable lock 300 may be similar in function and/or structure to the elements of example retractable lock 100 and 200, as they are described above. Retractable lock 300 may include a lock tab 302, and a bias member 306 disposed within a first device 304. The bias member 306 may exert a resistive force on the lock tab 302, and urge the lock tab 302 towards a first position, retracted within the first device 304. The lock tab 302 may insert into and engage with a tab receptacle 310 of a second device 312 when protruding from the first device 304 in a second position, as shown in FIG. 3. In some implementations, the second device 312 may include a magnet 308 disposed on or within the device. The magnet 308 may be disposed such that, upon the first and second device 304 and 312 coming into sufficiently close proximity to one another, the magnet 308 may exert an attractive magnetic force 303 upon a magnetic material within or coupled to the lock tab 302. The attractive magnetic force 303 may be sufficient to overcome the resistive force of the bias member 306, and draw or pull the lock tab 302 from the first position to the second position.

Figure 4A:
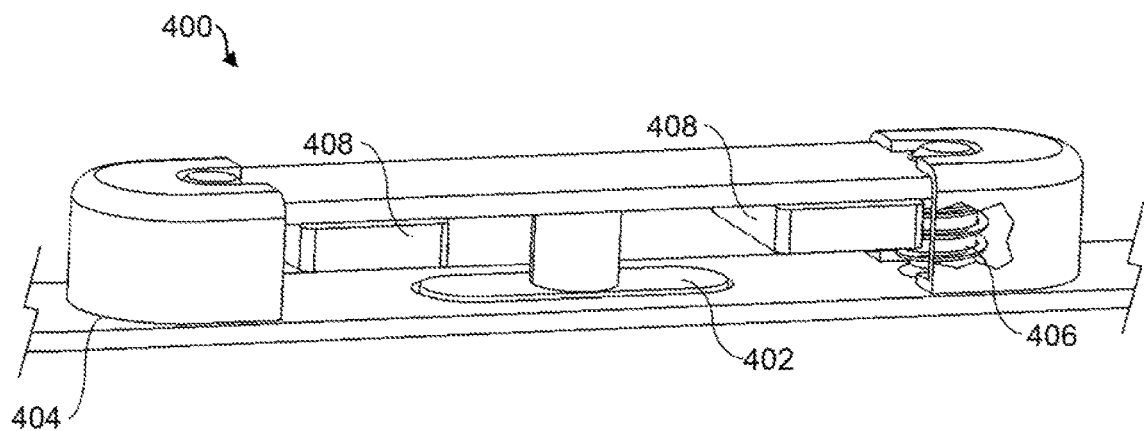
FIG. 4A is a perspective view of an example retractable lock.
Figure 4B:
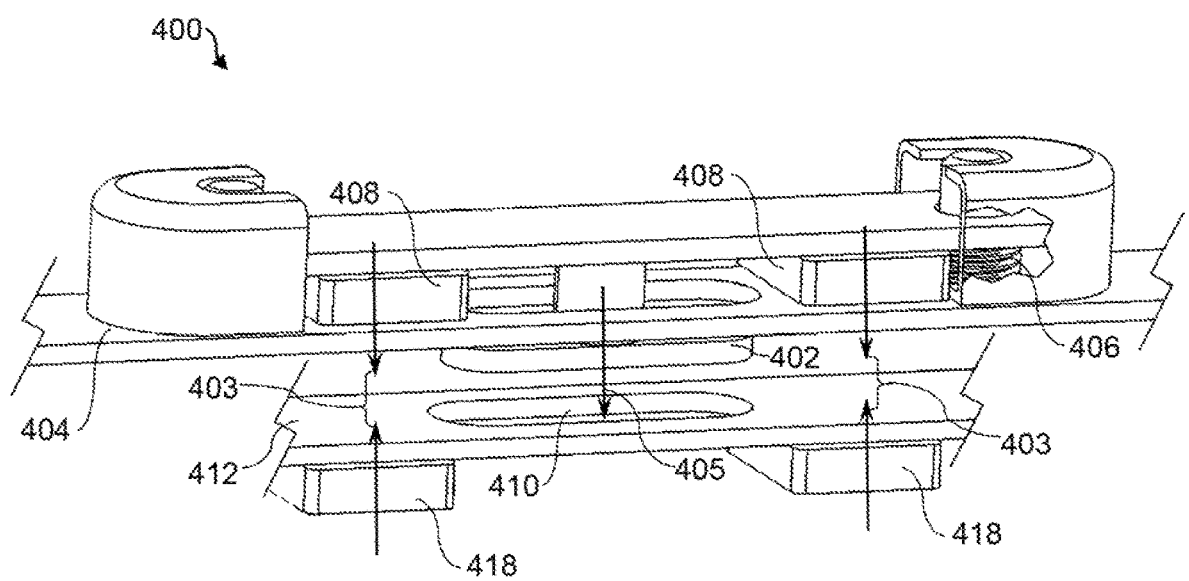
FIG. 4B is a perspective view of an example retractable lock.

Referring now to FIG. 4A, a perspective view of an example retractable lock 400 is illustrated. Example retractable lock 400 may be similar to any above-described example retractable locks. Further, the similarly named elements of example retractable lock 400 may be similar in function and/or structure to the elements of any example retractable locks, as they are described above. The retractable lock 400 may include a lock tab 402, and a bias member 406 biasing, or urging the lock tab 402 towards a first position, retracted within a first device 404. In some implementations, the retractable lock 400 may include a plurality of bias members 406 (not shown in FIG. 4A) to bias the lock tab 402 to the first position. Further, the retractable lock 400 may include a plurality of magnets disposed within the first device 404. The plurality of magnets 408 may be coupled to the lock tab 402 such that, upon coming into sufficiently close proximity to another, second magnet, plurality of second magnets, or another magnetic material, the plurality of magnets 408 may overcome the bias member 406 or plurality of bias members 406, and pull the lock tab 402 from the first position, to a second position, protruding out of the first device 404. Referring additionally to FIG. 4B, the lock tab 402 may engage with a complementary tab receptacle 410 disposed within or on a second device 412. The second device 412 may, in some implementations, comprise a second magnet 418, or a plurality of second magnets 418. The plurality of magnets 408 and the plurality of second magnets 418 may be disposed or oriented such that each of the plurality of magnets 408 is magnetically attracted to one of the plurality of second magnets 418, and vice-versa. The magnets 408 and second magnets 418 may be oriented such that, when the first device 404 and the second device 412 come within sufficient proximity to one another, a magnetic attraction 403 exists between the plurality of magnets 408 and the plurality of second magnets 418, as illustrated in FIG. 4B. The magnetic attraction 403 may be sufficient to overcome the bias member 406 or plurality of bias members 406, and pull the lock tab 402 to the second position such that the lock tab 402 may insert into the tab receptacle 410 along direction 405.

Figure 5A:
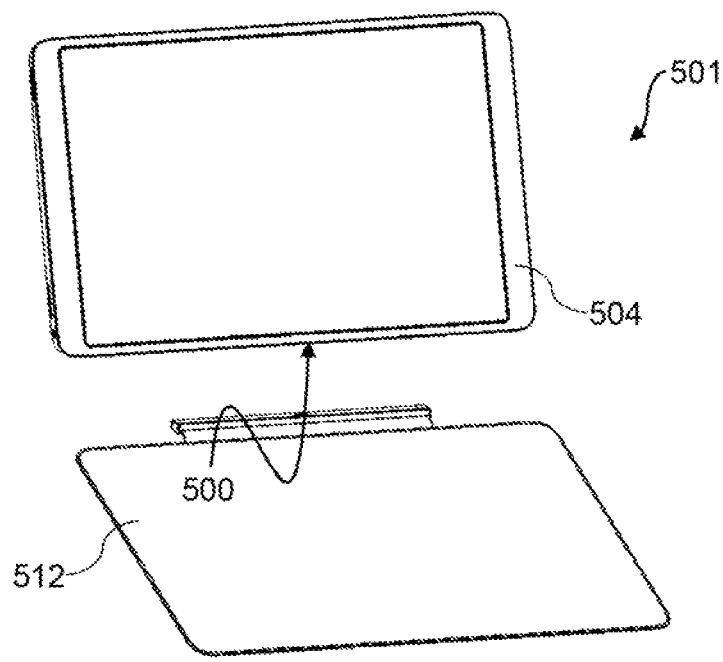
FIG. 5A is a perspective view of an example retractable lock.
Figure 5B:
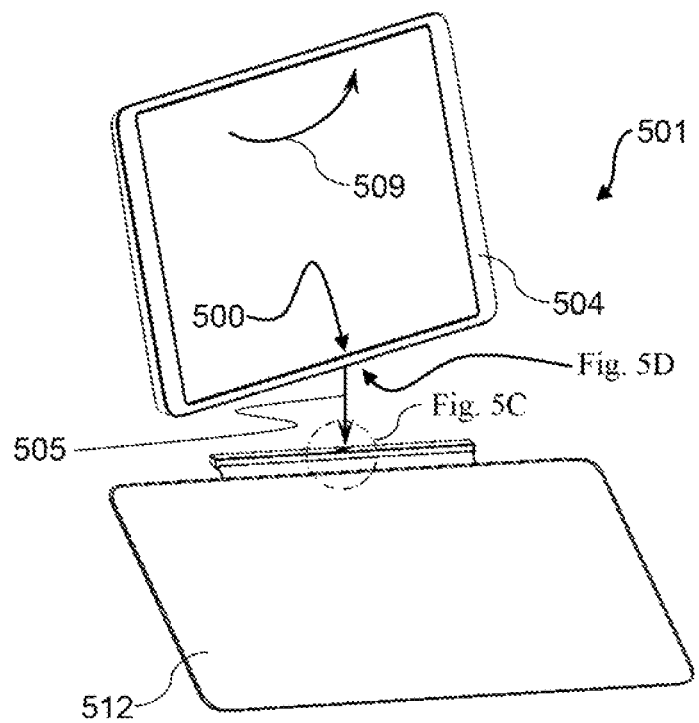
FIG. 5B is a perspective view of an example retractable lock.
Figure 5C:
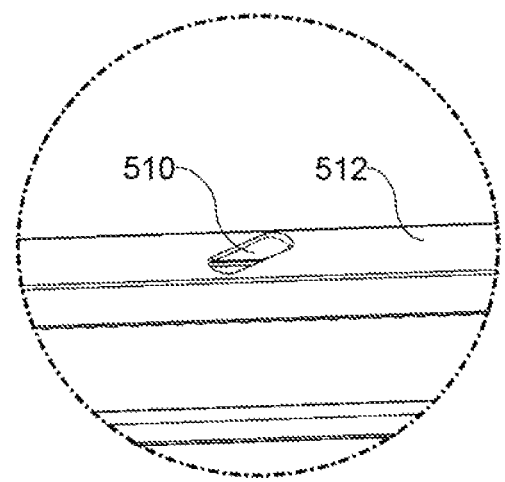
FIG. 5C is a detail view of an example retractable lock.
Figure 5D:
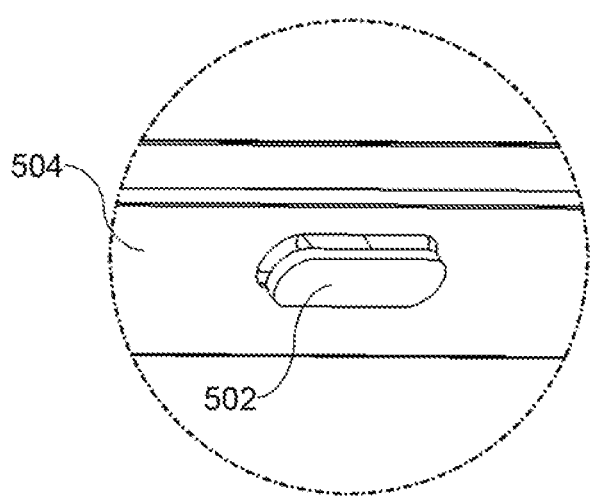
FIG. 5D is a detail view of an example retractable lock.

Referring now to FIG. 5A, a perspective view of an example locking system 501 including an example retractable lock 500 is illustrated. Example retractable lock 500 may be similar to any above-described example retractable locks. Further, the similarly named elements of example retractable lock 500 may be similar in function and/or structure to the elements of any example retractable locks, as they are described above. The locking system 501 may include a first device 504 and a second device 512. The example retractable lock 500 may be disposed within the first device 504, in some implementations. Referring additionally to FIGS. 5B-D, a perspective view and detail views of the example locking system 501 are illustrated. The example retractable lock 500 may include a lock tab 502 disposed within the first device 504 to engage with a complementary tab receptacle 510, along direction 505, disposed within the second device 512. In order to engage the lock tab 502 with the tab receptacle 510, the first device 504 and the second device 512 may be rotated relative to one another so that the lock tab 502 and the tab receptacle 510 are aligned. In the illustrated example, the first device 504 may be rotated along example direction 509 to line up the lock tab 502 with the tab receptacle 510. Please note, although FIGS. 5A-D illustrate the example retractable lock 500, and the lock tab 502 thereof, as disposed within the first device 504, while the tab receptacle 510 is disposed within the second device 512, the opposite disposition may also be possible. In other words, in some implementations, the retractable lock 500 and the constituent elements thereof, including the lock tab 502, may be disposed within the second device 512 while the tab receptacle 510 is disposed within the first device 504.

Figure 5E:
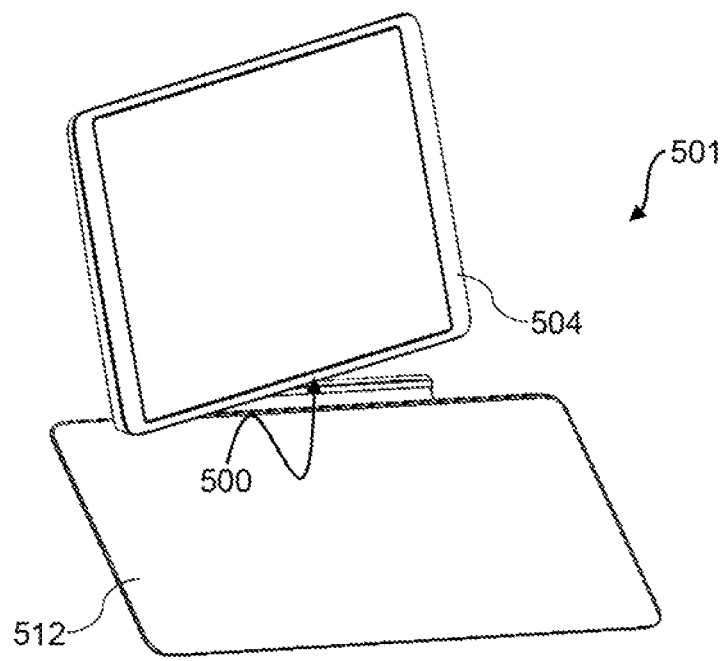
FIG. 5E is a perspective view of an example retractable lock.
Figure 5F:
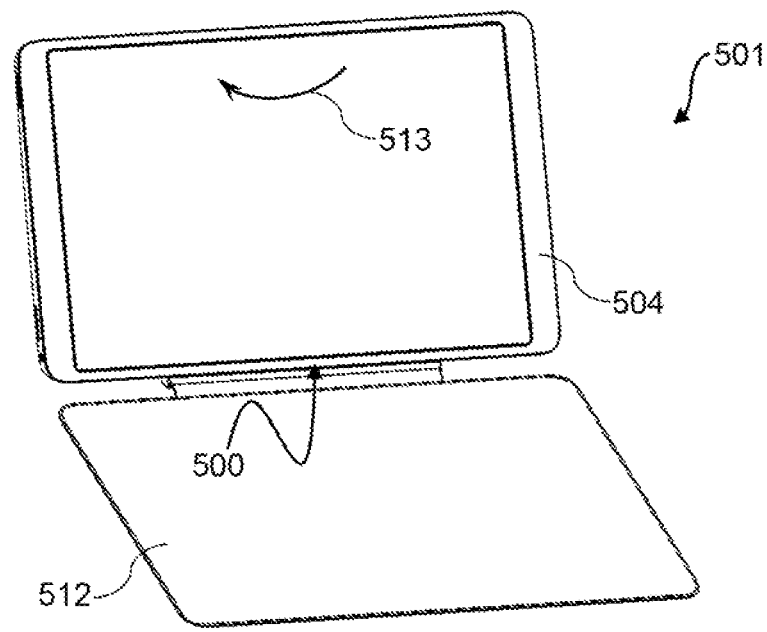
FIG. 5F is a perspective view of an example retractable lock.

Referring now to FIGS. 5E-F, a perspective view of the example locking system 501 is illustrated, wherein the lock tab 502 is engaged with the tab receptacle 510. The lock tab 502 has been inserted into tab receptacle 510 along direction 505 of FIG. 5B. As illustrated in FIG. 5E, the first device 504 is still rotated so that the lock tab 502 is aligned with tab receptacle 510. The first device 504 and the second device 512 may then be rotated relative to one another, for example, along example direction 513, so that the lock tab 502 and the tab receptacle 510 are no longer aligned, and the lock tab 502 is retained within the tab receptacle 510. Therefore, the first device 504 and the second device 512 may be coupled to one another.

In order to remove the second device 512 from the first device 504, the first and second devices 504 and 512 may be rotated relative to one another until the lock tab 502 and the complementary tab receptacle 510 are aligned. The first and second devices 504 and 512 may then be pulled away from each other until the lock tab 502 is disengaged from the tab receptacle 512, and the first and second devices 504 and 512 can be completely uncoupled from one another.

Figure 6:
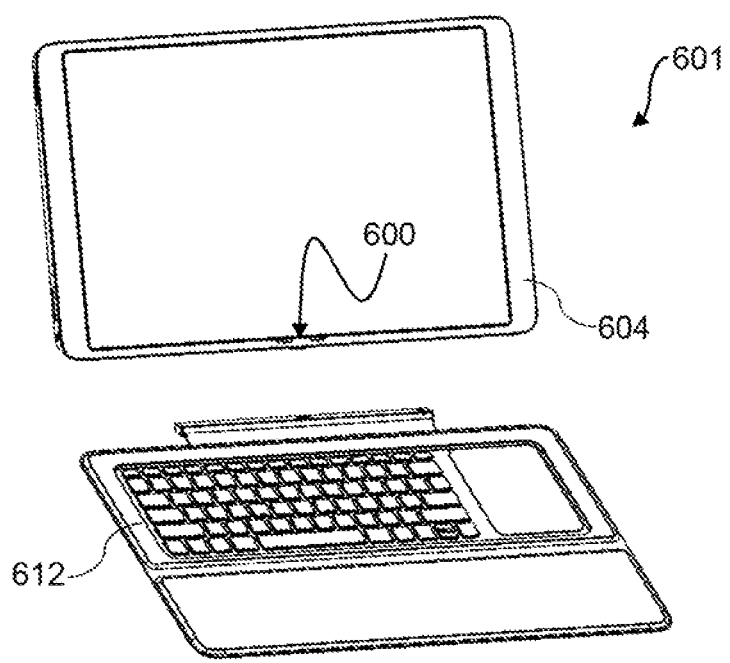
FIG. 6 is a perspective view of an example retractable lock.

Referring now to FIG. 6, a perspective view of an example locking system 601 having an example retractable lock 600 is illustrated. Example retractable lock 600 may be similar to any above-described example retractable locks. Further, the similarly named elements of example retractable lock 600 may be similar in function and/or structure to the elements of any example retractable locks, as they are described above. In some implementations, locking system 601 may include a first device 604 to be removably coupled to a second device 612. In some implementations, the first device may be a computing device, such as a tablet computer, smartphone, or other computing device. In further implementations, the second device 612 may be a removable keyboard or trackpad, or another user input device. The retractable lock 600 may include a lock tab to engage with a complementary tab receptacle. In some implementations, the retractable lock 600 may be disposed within the first device, and the tab receptacle may be disposed within the second device 612, or vice-versa.

What is claimed is:

1. A retractable lock, comprising:
   a lock tab disposed within a first device in a first position, the lock tab to engage with a complementary tab receptacle disposed within a separate, second device when the lock tab protrudes out of the first device in a second position;
   a bias member to bias the lock tab towards the first position; and
   a magnet disposed within the first device and movable with the lock tab to translate the lock tab to the second position when the magnet is drawn towards a magnetic material disposed within the second device.

2. The retractable lock of claim 1, wherein upon the lock tab being engaged with the complementary tab receptacle, the first device and the second device are to rotate relative to one another such that the lock tab is retained within the tab receptacle.

3. The retractable lock of claim 2, wherein the magnet is disposed within the second device and is attracted to a magnetic material attached to the lock tab within the first device.

4. The retractable lock of claim 2, wherein the tab receptacle is disposed at an oblique angle on the second device such that the lock tab may be inserted into the tab receptacle when the first device is disposed at the oblique angle, the first device then rotated such that the lock tab is not aligned with the tab receptacle and is retained within the tab receptacle, and a first surface of the first device and a first surface of the second device are aligned with one another.

5. The retractable lock of claim 1, wherein the magnetic material within the second device comprises a second magnet oriented such that the magnet within the first device is drawn towards the second magnet.

6. The retractable lock of claim 5, wherein the first device comprises a plurality of magnets, and the second device comprises a plurality of second magnets that are oriented such that each of the plurality of magnets is drawn towards a magnet of the plurality of second magnets disposed within the second device.

7. A retractable lock, comprising:
   a lock tab disposed within a first device;
   a bias member to bias the lock tab towards a first position, wherein the lock tab is retracted within the first device in the first position; and
   a magnet disposed within the first device and fixed to the lock tab, the magnet to translate the lock tab to a second position protruding out from the first device such that the lock tab may be received within a complementary tab receptacle disposed in a second device when the lock tab is aligned with the tab receptacle.

8. The retractable lock of claim 7, wherein the magnet is fixed to the lock tab such that, upon the magnet being moved, the lock tab is to move in a corresponding direction.

9. The retractable lock of claim 8, wherein the magnet is attracted to a magnetic material comprised within the second device, and wherein the magnetic material is to draw the magnet towards the magnetic material and the lock tab from the first position to the second position.

10. The retractable lock of claim 9, wherein the magnetic material comprised within the second device is a second magnet.

11. The retractable lock of claim 10, wherein the magnet and the second magnet are oriented such that they are attracted to each other.

12. A locking system, comprising:
   a retractable lock, comprising:
      a lock tab disposed within a first device and retracted within the first device in a first position; and
      a bias member to bias the lode tab towards the first position;
   a tab receptacle disposed in a second device to receive the lock tab upon the lock tab being moved to a second position, wherein the lock tab is to protrude from the first device when in the second position; and
   a magnet fixed to the lock tab to translate the lock tab to the second position when the magnet is drawn towards a second magnet disposed within the second device adjacent to the tab receptacle.

13. The locking system of claim 12, wherein the first device is a tablet computer and the second device is a removable keyboard.

14. The locking system of claim 12, wherein the lock tab includes a T-shaped geometry so as to define a ledge in between the lock tab and an outside surface of the first device when the lock tab is disposed in the second position.

15. The locking system of claim 14, wherein upon the lock tab being disposed within the complementary tab receptacle, the first and second device may be rotated relative to one another such that the lock tab and the tab receptacle are not aligned and the lock tab is retained within the tab receptacle.

16. The locking system of claim 15, wherein the first device and the second device are aligned to one another after being rotated relative to one another such that the lock tab and tab receptacle are not aligned and the lock tab is retained within the tab receptacle.

\* \* \* \* \*